(No Model.)

E. F. STEELE.
WATER VELOCIPEDE.

No. 298,792. Patented May 20, 1884.

Witnesses:

Elijah F. Steele
Inventor,
By Atty.

UNITED STATES PATENT OFFICE

ELIJAH F. STEELE, OF WALLINGFORD, CONNECTICUT.

WATER-VELOCIPEDE.

SPECIFICATION forming part of Letters Patent No. 298,792, dated May 20, 1884.

Application filed January 8, 1884. (No model.)

*To all whom it may concern:*

Be it known that I, ELIJAH F. STEELE, of Wallingford, in the county of New Haven and State of Connecticut, have invented a new Improvement in Water-Velocipedes; and I do hereby declare the following, when taken in connection with accompanying drawings and the letters of reference marked thereon, to be a full, clear, and exact description of the same, and which said drawings constitute part of this specification, and represent, in—

Figure 1:
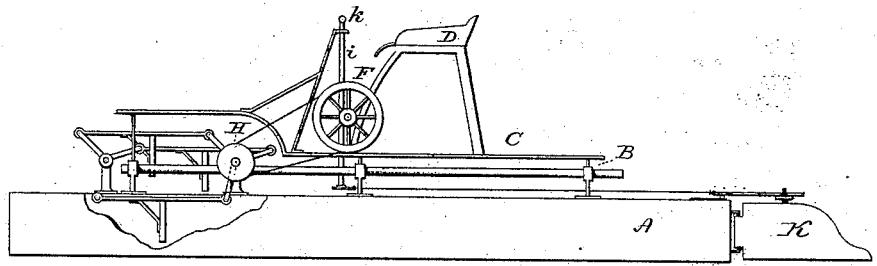
Figure 2:
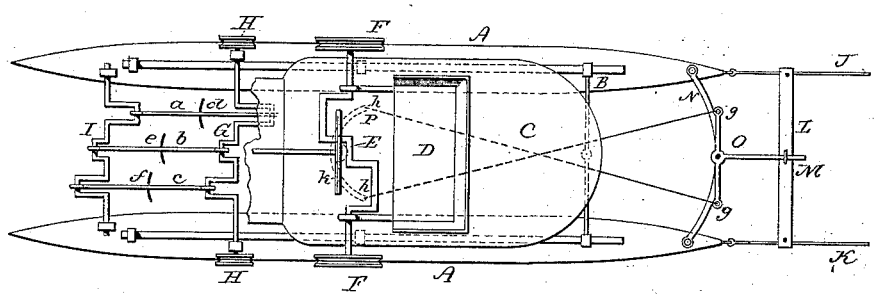

Figure 1, a side view; Fig. 2, a top view, and Fig. 3 a front end view.

This invention relates to an improvement in water-velocipedes; and it consists in constructing the water-velocipede with two narrow hulls, separated from each other after the manner of a "catamaran," the paddles operated by foot-power arranged between the two hulls, as more fully hereinafter described.

Figure 3:
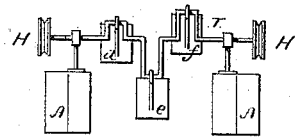

A A represent the two hulls firmly secured together by cross-rods B; C, the platform or deck over the space between the hulls, and raised above the top of the hulls, so as to leave a water-way between the top of the hulls and the deck; D, a raised seat upon the deck; E, a double-crank driving-shaft arranged to be easily reached and worked by a person sitting on the seat, held in bearings at each side, and having a pulley, F, fixed to each end, the cranks being in opposite directions, as seen in Fig. 2. Forward of the shaft E and parallel with it I arrange a triple-crank shaft, G, having a pulley, H, fixed at each end, corresponding to the pulleys F, and a belt passes around both the pulleys F and H. Forward of the shaft G and parallel with it I arrange a second triple-crank shaft, I, corresponding with the shaft G, the cranks of the two shafts connected, respectively, by a rod *a b c*, as seen in Fig. 2. On each of the rods about midway I fix a paddle-blade, *d e f*, extending vertically downward, as seen in Fig. 3. Now, when the crank-shaft E is revolved, the motion is imparted to the shaft G through the belts around the pulleys F and H, as seen in Fig. 1, and the shaft I revolves by the connecting-rods *a b c*, as seen in Fig. 2, so that when the shafts are revolved the blades *d e f*, attached to the rods, have a vertical circular motion—that is, a downward and backward motion through the water, and an upward and forward motion out of the water, the circular motion being the same as that of the cranks of the shafts G and I. By using the triple-crank shafts, one of the blades is always in the water, as seen in Fig. 3. In order to steer the boat, I hinge rudders J and K—one on the stern of each hull—and connect their upper edge to about midway of their length by a bar, L, on the center of which I form an eye, M, as seen in Fig. 2. Across the stern of the hulls I fix a bar, N, having a socket in the center. In this socket I hang a T-shaped lever, O, the leg of which passes through the eye M in the bar L. At each end of the cross of the T-shaped lever O, I form an eye, *g*. Directly in front of the seat I arrange in suitable bearings a vertical shaft, *i*, which passes through the deck, and has a cross-piece, P, at its lower end with an eye, *h*, at each end of the cross-piece. On the top of this shaft a handle, *k*, is fixed in convenient position to the seat, so that the shaft may be easily turned by a person sitting on the seat. I connect the eyes in the cross-piece P with the eyes in the cross of the T-shaped lever O, so that the cords will be crossed, as seen in Fig. 2, and so that, when the handle is turned, the cords connecting the eyes will cause the T-shaped lever O to turn in the socket of the cross-bar N. The leg, correspondingly moved, either to the right or left, as desired, moves the bar L, and thus moves the rudders J and K, as shown in dotted lines, Fig. 2.

The cords connecting the cross-piece P with the cross of the T-shaped lever O may run direct, instead of being crossed; but I prefer to cross them, as being more convenient for the person steering.

Instead of the pulleys and belts for driving the shaft G, any of the well-known equivalents therefor may be substituted.

I do not claim, broadly, a propeller consisting of the blades arranged upon connecting-rods operated by a crank at each end of said rods, whereby said blades may dip into the water, work through the water, then be raised therefrom to advance while out of the water; neither do I claim, broadly, a boat composed of two hulls with propeller between; nor do I claim, broadly, providing two such hulls with respective rudders connected so as to be operated from a single point, as I am aware that these features, broadly considered, are old.

I claim—

1. The combination of the two connected hulls A A, the deck C, fixed to but raised above said hulls, seat D, double-crank driving-shaft E, the two crank-shafts G and I, parallel to the said driving-shafts, one of said crank-shafts, G, in connection with the driving-shaft, whereby the revolution of the driving-shaft is communicated to said crank-shaft G, and rods connecting the respective cranks on said shafts G and I, each of said connecting-rods carrying a vertical blade, substantially as described.

2. In a water-velocipede consisting of the two hulls, A A, with propellers between them, and means for driving the same, the combination, with said hulls, of two connected rudders, J and K, the T-shaped lever O, hung between the hulls, the leg of the T in connection with said rudders, the vertical shaft $i$, provided with a handle, $k$, and the cross-piece P below the connections from each end of said cross-piece to the opposite ends of the T, substantially as described.

ELIJAH F. STEELE.

Witnesses:
ELIHU HALL,
W. J. LEAVENWORTH.